(12) United States Patent
Starling et al.

(10) Patent No.: US 10,649,852 B1
(45) Date of Patent: May 12, 2020

(54) INDEX METADATA FOR INODE BASED BACKUPS

(71) Applicant: EMC IP Holding Company LLC, Hopkinton, MA (US)

(72) Inventors: Jennifer Starling, Lake Forest, CA (US); Adam Brenner, Lake Forest, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 200 days.

(21) Appl. No.: 15/650,717

(22) Filed: Jul. 14, 2017

(51) Int. Cl.
*G06F 17/00* (2019.01)
*G06F 11/14* (2006.01)
*G06F 16/13* (2019.01)
*G06F 16/16* (2019.01)

(52) U.S. Cl.
CPC ...... *G06F 11/1451* (2013.01); *G06F 11/1448* (2013.01); *G06F 11/1469* (2013.01); *G06F 16/13* (2019.01); *G06F 16/164* (2019.01); *G06F 11/1435* (2013.01); *G06F 11/1464* (2013.01)

(58) Field of Classification Search
CPC .......................... G06F 11/1451; G06F 16/164
See application file for complete search history.

(56) References Cited

U.S. PATENT DOCUMENTS

| | | | |
|---|---|---|---|
| 7,577,808 B1* | 8/2009 | Kushwah | G06F 11/1469 707/999.202 |
| 8,417,715 B1* | 4/2013 | Bruckhaus | G06Q 10/04 707/758 |
| 2008/0133906 A1* | 6/2008 | Parkinson | H04L 9/3236 713/156 |
| 2016/0063021 A1* | 3/2016 | Morgan | G06F 16/182 707/747 |
| 2017/0177452 A1* | 6/2017 | Parab | G06F 16/13 |

* cited by examiner

*Primary Examiner* — Syed H Hasan
(74) *Attorney, Agent, or Firm* — Womble Bond Dickinson (US) LLP

(57) ABSTRACT

One embodiment is related to a method for generating a searchable metadata table based on a backup data stream from a client to a backup system, comprising: generating a plurality of intermediate tables; and generating a searchable metadata table based on the plurality of intermediate tables, wherein the searchable metadata table may comprise, for each file or directory in a row, an inode number, a metadata hash value, an acl hash value, a name, a full path, a size, and a time of last modification.

21 Claims, 10 Drawing Sheets

300

| INO DEC | INO HEX | ACL ID | PATH |
|---------|---------|--------|------|
| 2 | 002 | A1 | / |
| 300 | 12C | A1 | /d0/ |
| 250 | 0FA | A2 | /d0/f1 |
| 310 | 136 | A1 | /d1/ |
| 200 | 0C8 | A3 | /d1/d1.1/ |
| 100 | 064 | A2 | /d1/d1.1/f2 |

FIG. 3

| 410 | 420 | 430 | 440 | 450 | 460 | 470 | 480 | 490 |
|---|---|---|---|---|---|---|---|---|
| 002 | 0C8 | 12C | 136 | A1 | A2 | A3 | 064 | 0FA |
| STAT | STAT | STAT | STAT | STAT | STAT | STAT | STAT | STAT |
| ACL: A1 | ACL: A3 | ACL: A3 | ACL: A3 | ACL DATA | ACL DATA | ACL DATA | FILE DATA | FILE DATA |
| 002 . | 0C8 . | 12C . | 136 . | | | | | |
| 002 .. | 136 .. | 002 .. | 002 .. | | | | | |
| 12C d0 | 064 f2 | 0FA f1 | 0C8 d1.1 | | | | | |
| 136 d1 | | | | | | | | |

| INO HEX | METADATA HASH | ACL HASH | NAME | PARENT | SIZE | MTIME |
|---|---|---|---|---|---|---|
| 002 | H1 | H5 | / | | | |
| 12C | H4 | H5 | d0 | / | | |
| 0FA | H8 | H6 | f1 | /d0/ | 100 | |
| 136 | H3 | H5 | d1 | / | | |
| 0C8 | H2 | H7 | d1.1 | /d1/ | | |
| 064 | H9 | H6 | f2 | /d1/d1.1/ | 200 | |

| INO | NAME |
|-----|------|
| 002 | /    |
| 12C | d0   |
| 0FA | f1   |
| 136 | d1   |
| 0C8 | d1.1 |
| 064 | f2   |

| INO | METADATA HASH | STAT | ACL ID |
|-----|---------------|------|--------|
| 002 | H1 | STAT | A1 |
| 12C | H4 | STAT | A1 |
| 0FA | H8 | STAT | A2 |
| 136 | H3 | STAT | A1 |
| 0C8 | H2 | STAT | A3 |
| 064 | H9 | STAT | A2 |

| ACL ID | ACL HASH |
|--------|----------|
| A1 | H5 |
| A2 | H6 |
| A3 | H7 |

| INO | CHILDREN INODES |
|-----|-----------------|
| 002 | 12C, 136 |
| 0C8 | 064 |
| 12C | 0FA |
| 136 | 0C8 |

FIG. 8D

INDEX METADATA FOR INODE BASED BACKUPS

FIELD OF THE INVENTION

Embodiments of the disclosure are related to electronic devices, and more particularly, to a method, apparatus, and system for creating a searchable metadata table for backups.

BACKGROUND

A backup system (available from, e.g., Dell EMC or NetApp Inc.) typically comprises one or more storage devices into which information may be entered, and from which information may be obtained, as desired. The backup system includes a storage operating system that functionally organizes the system by, inter alia, invoking storage operations in support of a storage service implemented by the system. The backup system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The backup system may be configured to operate according to a client/server model of information delivery to thereby allow many clients to access the directories, files and blocks stored on the system. In this model, the client may comprise an application, such as a database application, executing on a computer that "connects" to the backup system over a computer network, such as a point-to-point link, shared local area network, wide area network or virtual private network implemented over a public network, such as the Internet. Each client may request the services of the file system by issuing file system protocol messages (in the form of packets) to the backup system over the network. By supporting a plurality of file system protocols, such as the conventional Common Internet File System (CIFS) and the Network File System (NFS) protocols, the utility of the backup system is enhanced.

Each data container, such as a file, directory, etc., within a file system is typically associated with an inode that serves as the root of a buffer tree of the data container. The buffer tree is an internal representation of blocks for the data container stored in the memory of the backup system and maintained by the file system. The inode is a data structure used to store information, such as metadata, about the data container, whereas the data blocks are structures used to store the actual data for the container. The inode typically contains a set of pointers to other blocks within the file system. For data containers, such as files, that are sufficiently small, the inode may directly point to blocks storing the data of the file. However, for larger files, the inode points to one or more levels of indirect blocks, which, in turn, may point to additional levels of indirect blocks and/or the blocks containing the data.

When a backup is performed, the data stream from the client to the backup system may be in an inode-based format that is very efficient. However, the inode-based format does not lend itself to generating searchable metadata, because metadata pertaining to a single object (file or directory) that is useful in a search is scattered around a number of records, which may be apart in the data stream.

BRIEF DESCRIPTION OF THE DRAWINGS

Embodiments of the invention are illustrated by way of example and not limitation in the figures of the accompanying drawings in which like references indicate similar elements.

FIG. 3 is a diagram illustrating a table summarizing the information pertaining to the example directory structure of FIG. 2.

FIG. 4 is a diagram illustrating data blocks corresponding to objects of the example directory structure in a backup data stream.

FIG. 7 is a diagram illustrating an example searchable metadata table, according to embodiments of the invention.

FIGS. 8A-8D are diagrams illustrating example intermediate tables, according to embodiments of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention are related to a method, apparatus, and system for generating a searchable metadata table of a backup based on a backup data stream in an optimized fashion under reasonable computational resource restrictions. A plurality of intermediate tables are generated and utilized for the generation of the searchable metadata table. With the searchable metadata table, a user may conveniently and efficiently search the backups using one or more useful attributes.

Figure 1:
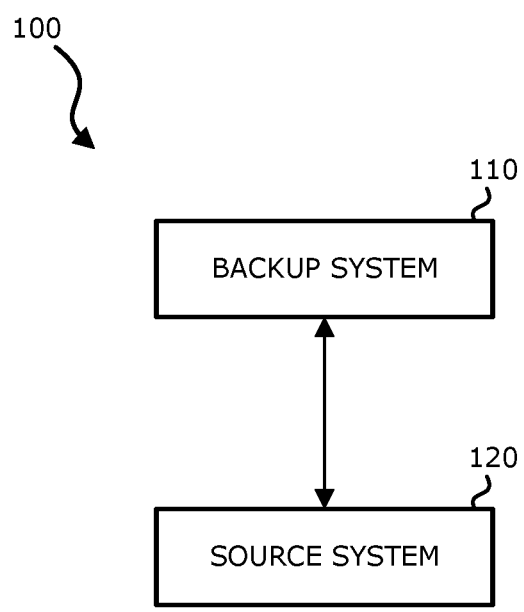
FIG. 1 is a block diagram illustrating an example environment in which embodiments of the invention may be practiced.

Referring to FIG. 1, a block diagram illustrating an example environment 100 in which embodiments of the invention may be practiced is shown. The environment 100 comprises a backup system 110 and a source system 120. The backup system 110 and the source system 120 are connected via a suitable data connection. From time to time or periodically, data and metadata from the source system 120 may be copied ("backed up") to the backup system 110 for safekeeping. It should be appreciated that the backup system 110 may not be limited to a single piece of hardware and may comprise any suitable combination of hardware and software to perform its functions. To reduce data traffic and/or save storage space at the backup system 110, the technique of incremental backup may be used. Further, the backup system 110 may perform deduplication on the backups stored thereon. In other words, an object that is present in more than one backups is nonetheless stored only once, and the single copy of the object may be referenced by the backups in which the object is present. In another embodiment, deduplication may be performed at the source system 120 when a new backup is performed. It should be further appreciated that the backup system 110 may serve additional source systems, and the number of source systems does not limit the invention.

Figure 2:
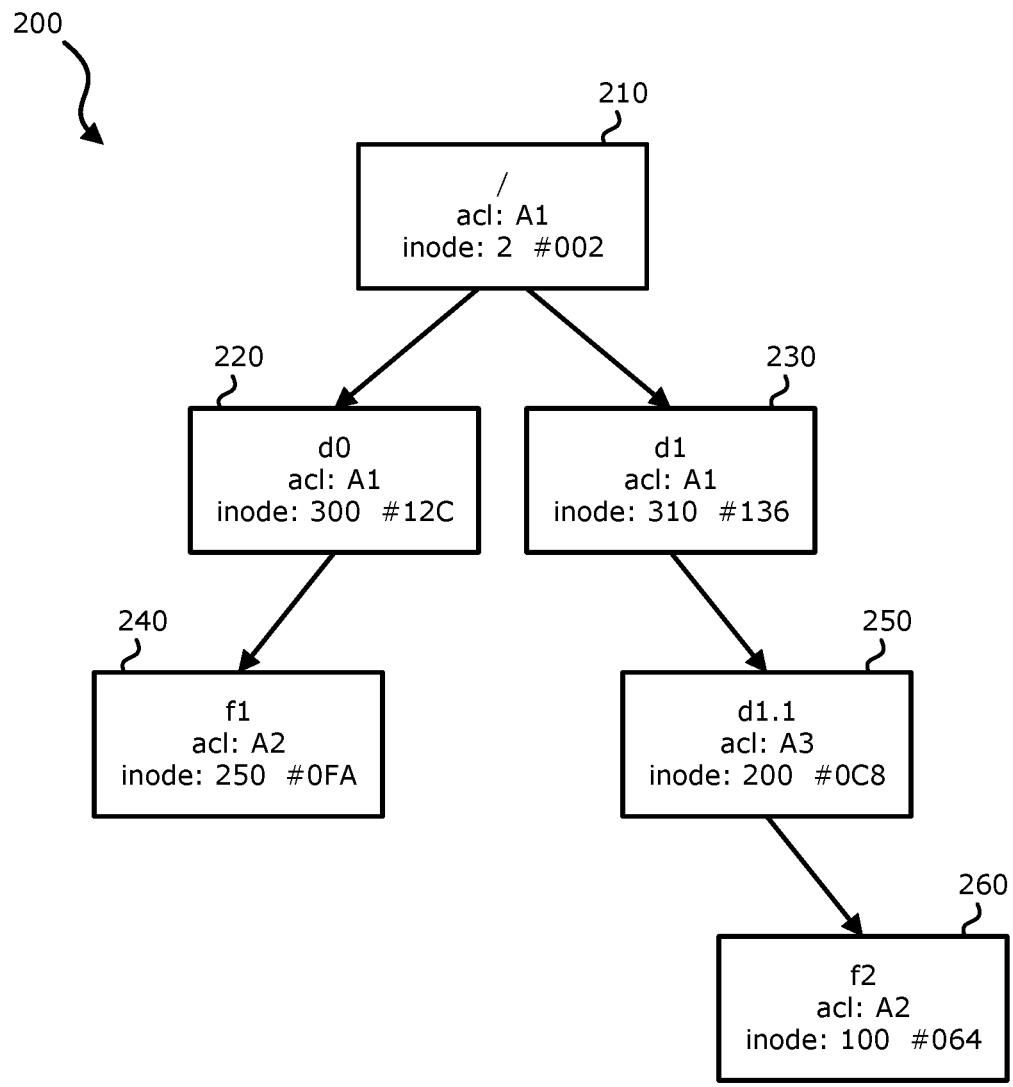
FIG. 2 is a diagram illustrating an example directory structure in a file system view.

Referring to FIG. 2, a diagram illustrating an example directory structure 200 in a file system view is shown. The root directory /210 is associated with the access control list (acl) A1 and has an inode number of 2 in decimal and 002 in hexadecimal. The root directory 210/contains two subdirectories: directory d0 220 and directory d1 230. Directory d0 220 is associated with the acl A1 and has an inode number of 300 in decimal and 12C in hexadecimal, whereas directory d1 230 is associated with the acl A1 and has an inode number of 310 in decimal and 136 in hexadecimal. Further, directory d0 220 contains a file f1 240, which is associated with the acl A2 and has an inode number of 250 in decimal and 0FA in hexadecimal. As to directory d1 230, directory d1 230 contains a further subdirectory, directory d1.1 250, which is associated with the acl A3 and has an inode number of 200 in decimal and 0C8 in hexadecimal. The directory d1.1 250 contains a file f2, which is associated with the acl A2 and has an inode number of 100 in decimal and 064 in hexadecimal. The above information pertaining to the example directory structure 200 is summarized in FIG. 3.

It should be appreciated that the example directory structure 200 is used as an example throughout the description hereinafter in the illustration of embodiments of the invention, but does not limit the invention.

Referring to FIG. 3, a diagram illustrating a table 300 summarizing the information pertaining to the example directory structure 200 of FIG. 2 is shown.

Referring to FIG. 4, a diagram 400 illustrating data blocks corresponding to objects of the example directory structure 200 in a backup data stream is shown. It should be appreciated that the data blocks are divided into three sections: the first section (blocks 410 through 440) corresponds to directories, the second section (blocks 450 through 470) acls, and the third section (blocks 480 and 490) files. Each section is in an inode ascending order (e.g., in the first section, a directory with a smaller inode number comes before a directory with a larger inode number; the same applies in the third section for files.). It should be noted that although data blocks in FIG. 4 contain much of the same information as inodes, they are not themselves inodes because instead of the pointers stored in inodes, actual data is stored in the data blocks of FIG. 4.

The data block 410 corresponds to the inode numbered 002 in hexadecimal. The data block 410 further contains information about the status (stat) of the directory with the inode number of 002 in hexadecimal including the size, the time of last access, the time of last modification, and the time of last status change. As illustrated in the data block 410, the directory is associated with the acl A1 and has two subdirectories named d0 and d1, whose inode numbers are 12C and 136 in hexadecimal, respectively. As can be seen in FIG. 2, the directory with the inode number of 002 in hexadecimal is the root directory /, therefore the inode numbers for the present directory (.) and the parent directory (..) are both also 002 in hexadecimal. The information about the directory d1.1 (inode number 0C8), d0 (inode number 12C), and d1 (inode number 136) is recorded in data blocks 420 through 440, respectively, in the same fashion.

Each acl data block in the second section (e.g., acl section) of the backup data stream contains an acl identifier (e.g., A1, A2, A3) and the acl data associated with the acl identifier.

As to files, the data block 480 corresponds to the inode numbered 064 in hexadecimal. As can be seen in FIG. 2, this corresponds to the file f2. The data block 480 further comprises the stat record and the data for the file. The information about the file f1 is recorded in the data block 490 in the same fashion.

It should be noted that the stat record does not contain the name of the file or directory. The names are available only from the contents of the directories (however, a directory's content does not contain its own name).

Figure 5:
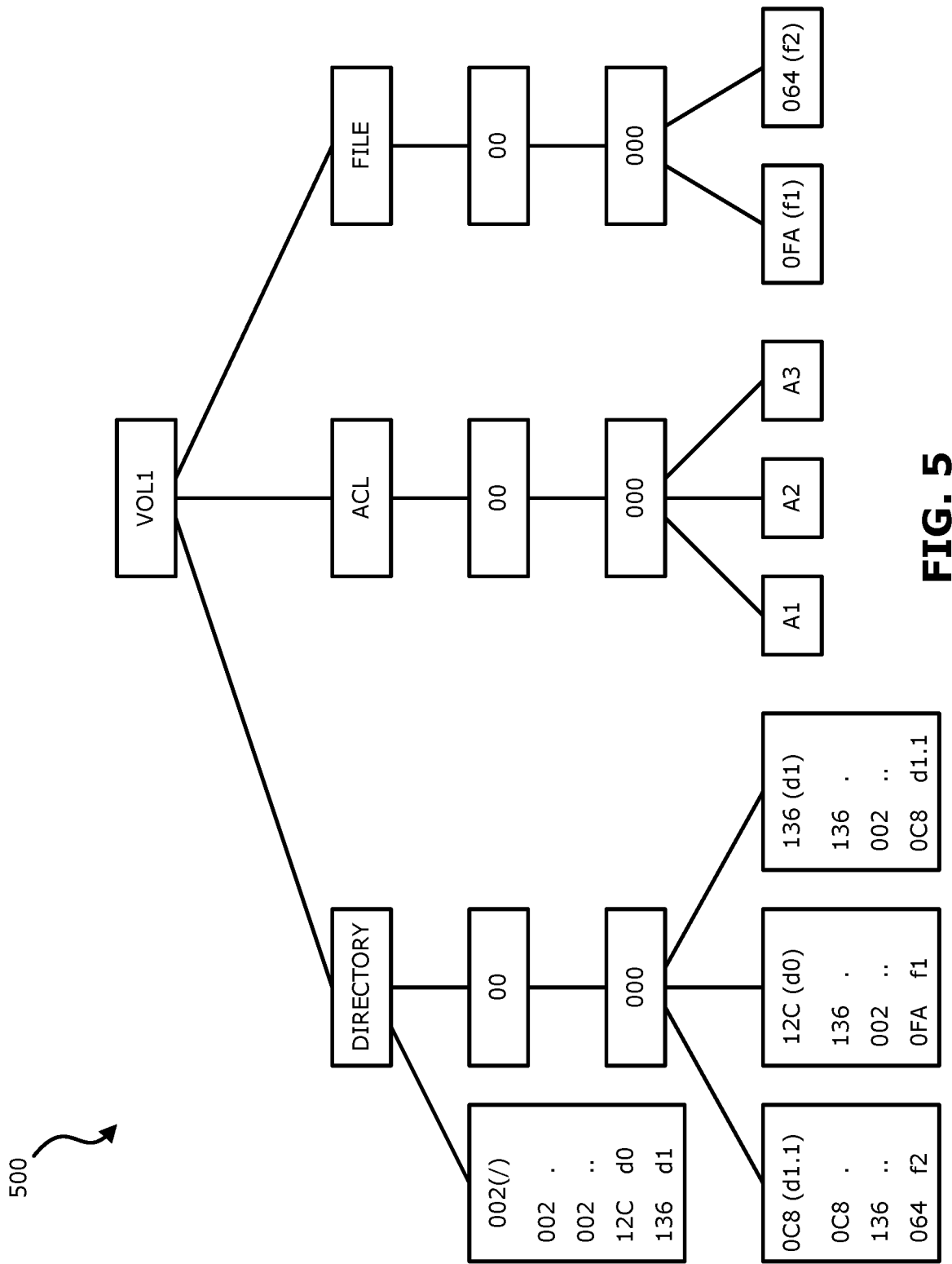
FIG. 5 is a diagram illustrating an example conventional metadata catalog in a Merkle tree inode view.

Referring to FIG. 5, a diagram illustrating an example conventional metadata catalog 500 in a Merkle tree inode view is shown. It should be appreciated that FIG. 5 represent a conventional way in which metadata is stored in a catalog in a backup system. As a person skilled in the art would understand, because the bottom layer of the tree is in the same order as the data stream illustrated in FIG. 4, incremental backups can be performed with great efficiency.

However, to allow for a convenient and efficient search, the name, stat record (size, time, etc.), acl (or acl hash), and full path for each file or directory should be readily available within one row in one document. Since the order of the data blocks in the data stream is inode number-based, the information for any particular file or directory is scattered across many data blocks. Without an optimized method, gathering the requisite information to put into one row would require too much memory space and modifying records in a database is expensive.

For example, referring back to FIG. 4, the stat record for d1.1 (inode number 0C8) is available at the data block 420, but the name of the directory ("d1.1") is not available until the data block 440, which is two data blocks later. As an additional example, the name of the directory d0 is available at the data block 410, but the stat record for the directory is not available until the data block 430, again two data blocks later. Further, the acl A3 is referenced first in the data block 420, but the actual acl data for the acl A3 is not available until the data block 470, which is five blocks later.

Figure 6:
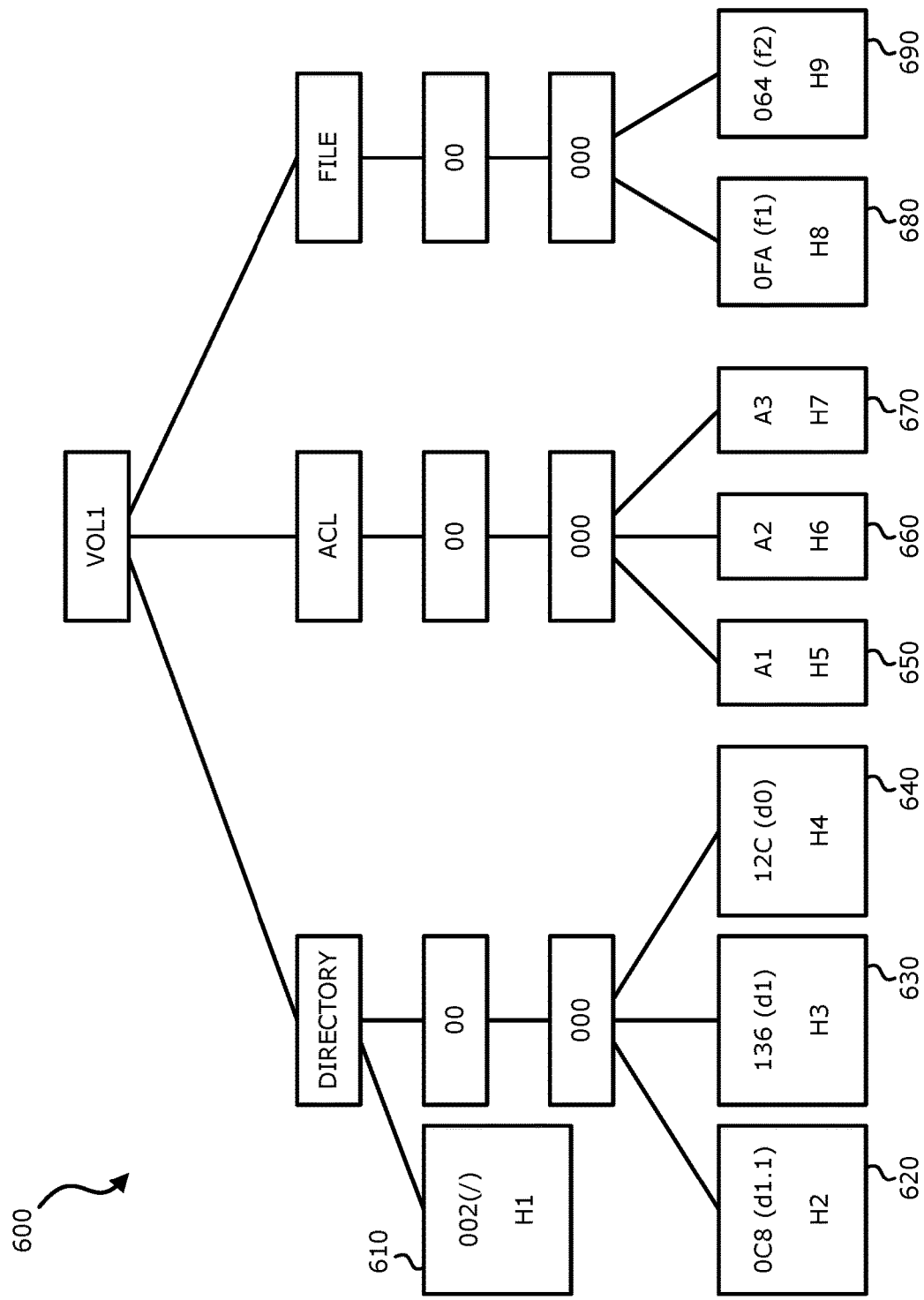
FIG. 6 is a diagram illustrating an example modified metadata catalog in a Merkle tree inode view, according to embodiments of the invention.

Referring to FIG. 6, a diagram illustrating an example modified metadata catalog 600 in a Merkle tree inode view, according to embodiments of the invention, is shown. Compared to the conventional metadata catalog 500 of FIG. 5, the modified metadata catalog 600 further stores in its leaf nodes (i.e., nodes at the bottom layer) hash values. For leaf nodes corresponding to directories and files, the hash values for the corresponding metadata are stored. Hash values H1 through H4 are generated based on metadata of the directories /, d1.1, d1, and d0, in that order, and are stored in respective leaf nodes (nodes 610 through 640). Similarly, hash values H8 and H9 are generated based on metadata of the files f1 and f2, in that order, and are stored in respective leaf nodes (nodes 680 and 690). For leaf nodes corresponding to acls, corresponding acl hash values are stored: acl hash values H5 through H7 are generated based on the acls A1 through A3, in that order, and are stored in respective leaf nodes (nodes 650 through 670). In one embodiment, the backup system may store the modified metadata catalog 600 instead of the conventional metadata catalog 500 of FIG. 5.

Referring to FIG. 7, a diagram illustrating an example searchable metadata table 700, according to embodiments of the invention, is shown. The searchable metadata table 700 contains the information required for a convenient and efficient search. For each file or directory, the searchable metadata table 700 records, in one row, the inode number (e.g., in hexadecimal), metadata hash value, acl hash value, name, full path (parent), size, and time of last modification (Mtime). It should be noted that the table 700 and the catalog 600 of FIG. 6 are linked through metadata hash values. Therefore, when an object (file or directory) is deleted at the backup system, the deletion is reflected in the metadata catalog 600, and the corresponding row in the searchable metadata table 700 can be easily found for deletion based on the metadata hash associated with the deleted object, with no extra lookups.

As explained above, creating the searchable metadata table 700 based on the backup data stream in memory without an optimized method is too expensive. In one embodiment, intermediate data may be generated at either the source system or a proxy situated between the source system and the backup system while the backup process is running. The local database (on either the source system or the proxy) may be used to store the intermediate data in the form of intermediate tables (explained below) on the local disk (of either the source system or the proxy). The searchable metadata table (e.g., searchable metadata table 700), once generated at the source system or the proxy, may be transmitted to and stored at the backup system. In another embodiment, the generation of the intermediate data and the searchable metadata table may take place at the backup system. The intermediate data does not need to be persisted once each backup is completed and the searchable metadata table (e.g., searchable metadata table 700) generated or updated.

Referring to FIGS. 8A-8D, diagrams illustrating example intermediate tables 800A-800D, according to embodiments of the invention, are shown. The intermediate table 800A of FIG. 8A associates inode numbers (e.g., in hexadecimal) for both files and directories with file/directory names, and can be populated based on the first section (directory section) of the backup data stream when the first section is read. The intermediate table 800B of FIG. 8B associates inode numbers (e.g., in hexadecimal) for both files and directories with file/directory metadata hash values, stat records, and acl identifiers. Each row of the intermediate table 800B can be populated based on the corresponding data block for the file or directory when the data block is read. The intermediate table 800C of FIG. 8C associates acl identifiers with acl hash values, and can be populated based on the second section (acl section) of the backup data stream when the second section is read. Further, the intermediate table 800D of FIG. 8D associates inode numbers (e.g., in hexadecimal) for directories with inode numbers of their children (immediate subdirectories and files), and can be populated based on the first section (directory section) of the backup data stream when the first section is read.

Based on intermediate tables 800A-800D, the searchable metadata table 700 may be generated or updated with reasonable computational resources. For each row in the searchable metadata table 700, the name can be obtained from the intermediate table 800A. The metadata hash value, size, and time of last modification can be obtained from the intermediate table 800B. The acl hash value can be obtained from the intermediate table 800B and then the intermediate table 800C, the two intermediate tables being linked by acl identifiers. Further, the intermediate table 800D may be looked up recursively to generate the full paths (parents) for all files and directories, in combination with the intermediate table 800A.

It should be appreciated that the number and particular organization of the intermediate tables do not limit the invention. The intermediate tables can be organized in any suitable form as long as the intermediate tables can be efficiently generated based on the backup data stream and the searchable metadata table can be efficiently generated based on the intermediate tables.

Figure 9:
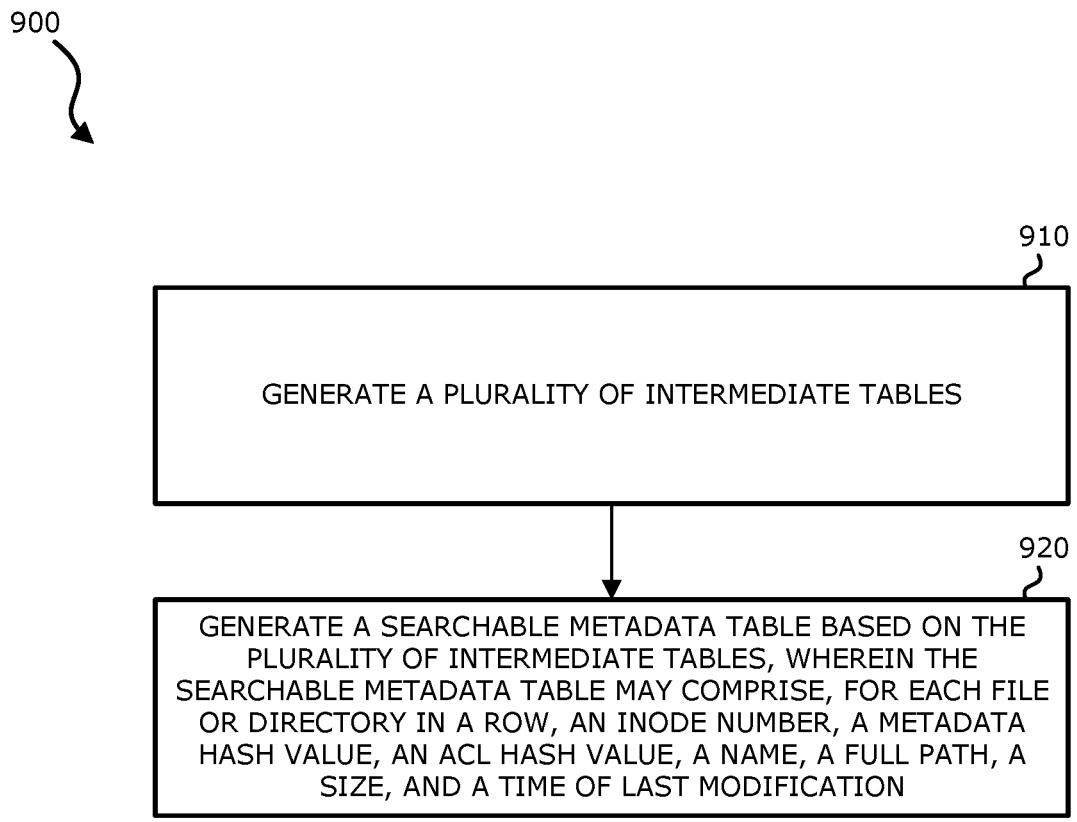
FIG. 9 is a flowchart illustrating an example method for generating a searchable metadata table based on a backup data stream from a client to a backup system.

Referring to FIG. 9, a flowchart illustrating an example method 900 for generating a searchable metadata table based on a backup data stream from a client to a backup system is shown. At block 910, a plurality of intermediate tables may be generated. In one embodiment, the plurality of intermediate tables may comprise a first intermediate table that associates inode numbers for files and directories with file or directory names, a second intermediate table that associates inode numbers for files and directories with file or directory metadata hash values, status (stat) records, and access control list (acl) identifiers, a third intermediate table that associates acl identifiers with acl hash values, and a fourth intermediate table that associates inode numbers for directories with inode numbers of their children may be generated. At block 920, a searchable metadata table may be generated based on the plurality of intermediate tables, wherein the searchable metadata table may comprise, for each file or directory in a row, an inode number, a metadata hash value, an acl hash value, a name, a full path, a size, and a time of last modification. After the searchable metadata table is generated, the intermediate tables can be discarded (e.g., deleted).

In embodiments where the four intermediate tables described above are utilized, in generating the searchable metadata table, the name for each file or directory may be obtained based on the first intermediate table. The metadata hash value, the size, and the time of last modification for each file or directory may be obtained based on the second intermediate table. The acl hash value for each file or directory may be obtained based on the second and third intermediate tables. The full path for each file or directory may be obtained based on the first and fourth intermediate tables.

Further, a metadata catalog may be stored in a Merkle tree in the backup system, wherein each leaf node of the Merkle tree for a file or directory comprises a metadata hash value for the file or directory. A row for a file or directory in the searchable metadata table may be searched for for deletion based on a metadata hash value.

Method 900 may be performed by processing logic that includes hardware (e.g. circuitry, dedicated logic, etc.), software (e.g., embodied on a non-transitory computer readable medium), or a combination thereof. For example, method 900 may be performed by processors 1501 of FIG. 10. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the invention are related to a method, apparatus, and system for generating a searchable metadata table of a backup based on a backup data stream in an optimized fashion under reasonable computational resource restrictions. A plurality of intermediate tables are generated and utilized for the generation of the searchable metadata table. With the searchable metadata table, a user may conveniently and efficiently search the backups using one or more useful attributes.

Figure 10:
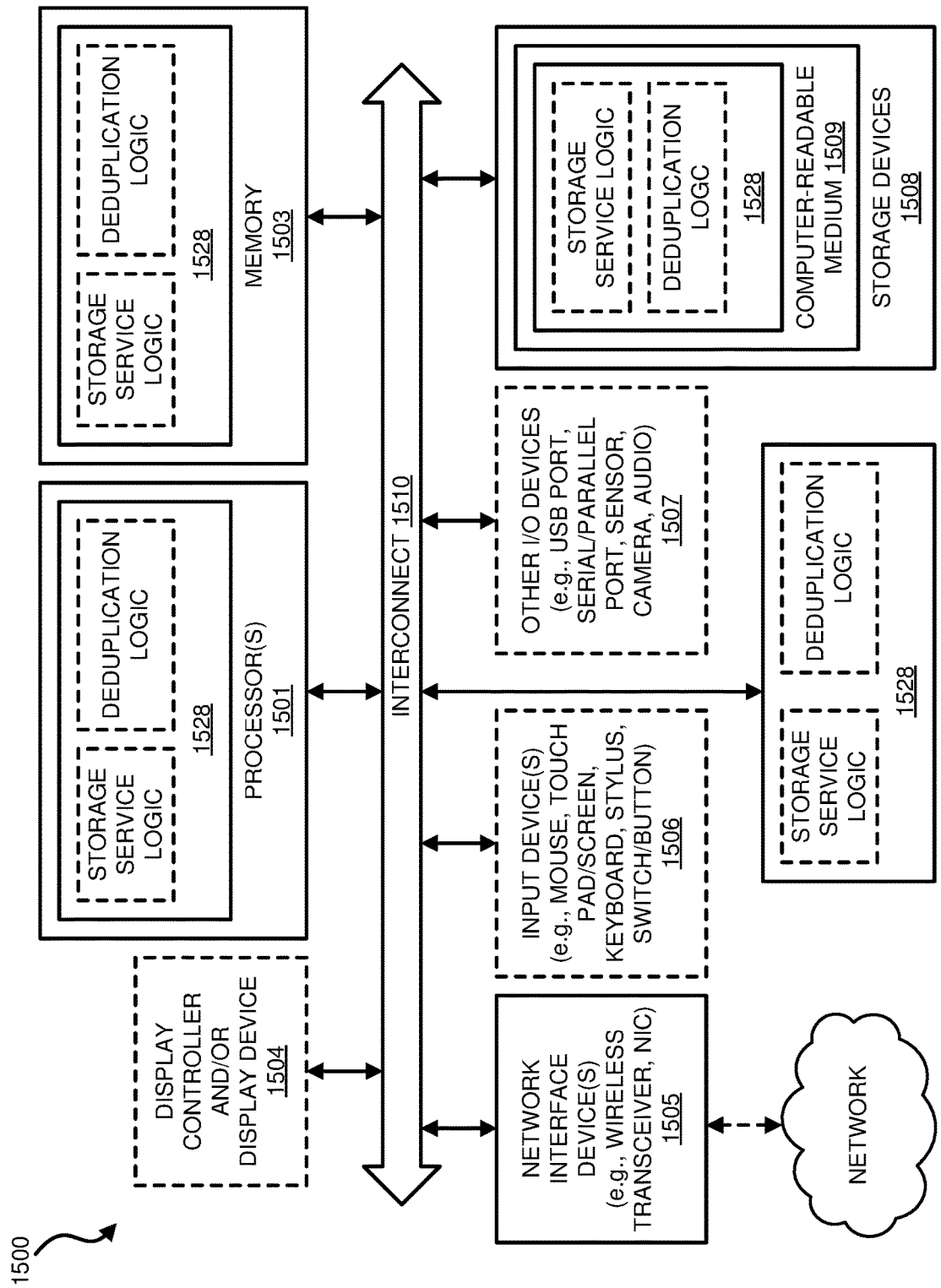
FIG. 10 is a block diagram illustrating an example of a data processing system which may be used with one embodiment of the disclosure.

FIG. 10 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented storage method, comprising:
generating a plurality of intermediate tables based on a backup data stream transmitted from a client to a backup system, the backup data stream comprising data blocks arranged at least partially in an inode number ascending order, wherein the plurality of intermediate tables comprise a first intermediate table that associates inode numbers for files and directions with file or directory names, a second intermediate table that associates inode numbers for files and directories with file or directory metadata has values, status (stat) records, and acl identifiers, a third intermediate table that associates acl identifiers with acl hash values, and a fourth intermediate table that associates inode numbers for directories with inode numbers of their children;

generating a searchable metadata table based on the plurality of intermediate tables, wherein the searchable metadata table comprises, for each file or directory in one row, an inode number, a metadata hash value, an access control list (ad) hash value, a name, a full path, a size, and a time of last modification; and performing a user-initiated file or directory search using the searchable metadata table based on at least one of: an inode number, a metadata hash value, an ad hash value, a name, a full path, a size, a time of last modification, or any combination thereof.

2. The method of claim 1, wherein the name for each file or directory in the searchable metadata table is obtained based on the first intermediate table.

3. The method of claim 1, wherein the metadata hash value, the size, and the time of last modification for each file or directory in the searchable metadata table are obtained based on the second intermediate table.

4. The method of claim 1, wherein the ad hash value for each file or directory in the searchable metadata table is obtained based on the second and third intermediate tables.

5. The method of claim 1, wherein the full path for each file or directory in the searchable metadata table is obtained based on the first and fourth intermediate tables.

6. The method of claim 1, further comprising storing a metadata catalog in a Merkle tree in the backup system, wherein each leaf node of the Merkle tree for a file or directory comprises a metadata hash value for the file or directory.

7. The method of claim 6, further comprising searching for a row for a file or directory in the searchable metadata table for deletion based on a metadata hash value.

8. A non-transitory machine-readable medium having instructions stored therein which, when executed by a processor, cause the processor to perform storage operations, the operations comprising:

generating a plurality of intermediate tables based on a backup data stream transmitted from a client to a backup system, the backup data stream comprising data blocks arranged at least partially in an inode number ascending order, wherein the plurality of intermediate tables comprise a first intermediate table that associates inode numbers for files and directions with file or directory names, a second intermediate table that associates inode numbers for files and directories with file or directory metadata has values, status (stat) records, and acl identifiers, a third intermediate table that associates acl identifiers with acl hash values, and a fourth intermediate table that associates inode numbers for directories with inode numbers of their children;

generating a searchable metadata table based on the plurality of intermediate tables, wherein the searchable metadata table comprises, for each file or directory in one row, an inode number, a metadata hash value, an access control list (ad) hash value, a name, a full path, a size, and a time of last modification; and performing a user-initiated file or directory search using the searchable metadata table based on at least one of: an inode number, a metadata hash value, an ad hash value, a name, a full path, a size, a time of last modification, or any combination thereof.

9. The non-transitory machine-readable medium of claim 8, wherein the name for each file or directory in the searchable metadata table is obtained based on the first intermediate table.

10. The non-transitory machine-readable medium of claim 8, wherein the metadata hash value, the size, and the time of last modification for each file or directory in the searchable metadata table are obtained based on the second intermediate table.

11. The non-transitory machine-readable medium of claim 8, wherein the ad hash value for each file or directory in the searchable metadata table is obtained based on the second and third intermediate tables.

12. The non-transitory machine-readable medium of claim 8, wherein the full path for each file or directory in the searchable metadata table is obtained based on the first and fourth intermediate tables.

13. The non-transitory machine-readable medium of claim 8, wherein the operations further comprise storing a metadata catalog in a Merkle tree in the backup system, wherein each leaf node of the Merkle tree for a file or directory comprises a metadata hash value for the file or directory.

14. The non-transitory machine-readable medium of claim 13, wherein the operations further comprise searching for a row for a file or directory in the searchable metadata table for deletion based on a metadata hash value.

15. A data processing system, comprising:
a processor; and
a memory coupled to the processor storing instructions which, when executed by the processor, cause the processor to perform storage operations, the operations including generating a plurality of intermediate tables based on a backup data stream transmitted from a client to a backup system, the backup data stream comprising data blocks arranged at least partially in an inode number ascending order, wherein the plurality of intermediate tables comprise a first intermediate table that associates inode numbers for files and directions with file or directory names, a second intermediate table that associates inode numbers for files and directories with file or directory metadata has values, status (stat) records, and acl identifiers, a third intermediate table that associates acl identifiers with acl hash values, and a fourth intermediate table that associates inode numbers for directories with inode numbers of their children;

generating a searchable metadata table based on the plurality of intermediate tables, wherein the searchable metadata table comprises, for each file or directory in one row, an inode number, a metadata hash value, an access control list (ad) hash value, a name, a full path, a size, and a time of last modification; and performing a user-initiated file or directory search using the searchable metadata table based on at least one of: an inode number, a metadata hash value, an ad hash value, a name, a full path, a size, a time of last modification, or any combination thereof.

16. The data processing system of claim 15, wherein the name for each file or directory in the searchable metadata table is obtained based on the first intermediate table.

17. The data processing system of claim 15, wherein the metadata hash value, the size, and the time of last modification for each file or directory in the searchable metadata table are obtained based on the second intermediate table.

18. The data processing system of claim 15, wherein the ad hash value for each file or directory in the searchable metadata table is obtained based on the second and third intermediate tables.

19. The data processing system of claim 15, wherein the full path for each file or directory in the searchable metadata table is obtained based on the first and fourth intermediate tables.

20. The data processing system of claim 15, wherein the operations further comprise storing a metadata catalog in a Merkle tree in the backup system, wherein each leaf node of the Merkle tree for a file or directory comprises a metadata hash value for the file or directory.

21. The data processing system of claim 20, wherein the operations further comprise searching for a row for a file or directory in the searchable metadata table for deletion based on a metadata hash value.

* * * * *

UNITED STATES PATENT AND TRADEMARK OFFICE
CERTIFICATE OF CORRECTION

PATENT NO. : 10,649,852 B1
APPLICATION NO. : 15/650717
DATED : May 12, 2020
INVENTOR(S) : Jennifer Starling and Adam Brenner It is certified that error appears in the above-identified patent and that said Letters Patent is hereby corrected as shown below:

In the Claims

Claim 1, Column 10, Line 67, "inode numbers for files and directions with file or" should read, "inode numbers for files and directories with file or"

Claim 1, Column 11, Line 3, "or directory metadata has values, status (stat) records," should read, "or directory metadata hash values, status (stat) records,"

Claim 8, Column 11, Line 51, "inode numbers for files and directions with file or" delete the word "directions" and replace it with the word "directories"

Claim 8, Column 11, Line 54, "or directory metadata has values, status (stat) records," should read, "or directory metadata hash values, status (stat) records,"

Claim 15, Column 12, Line 44, "directions with file or directory names, a second" should read, "directories with file or directory names, a second"

Claim 15, Column 12, Line 47, "has values, status (stat) records, and acl identifiers, a" should read, "hash values, status (stat) records, and acl identifiers, a"

Signed and Sealed this
Eighth Day of December, 2020

Andrei Iancu
*Director of the United States Patent and Trademark Office*